(12) United States Patent
Mukai et al.

(10) Patent No.: US 9,332,326 B2
(45) Date of Patent: May 3, 2016

(54) OPTICAL TRANSMISSION DEVICE AND MONITORING METHOD OF OPTICAL SIGNAL

(71) Applicant: FUJITSU LIMITED, Kawasaki-shi (JP)

(72) Inventors: Akihiro Mukai, Fukuoka (JP); Takaaki Itose, Fukuoka (JP); Hiroki Takaki, Fukuoka (JP); Ichiro Nakajima, Koto (JP); Yoshinobu Matsukawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/449,286

(22) Filed: Aug. 1, 2014

(65) Prior Publication Data

US 2015/0063798 A1  Mar. 5, 2015

(30) Foreign Application Priority Data

Sep. 2, 2013 (JP) ................................. 2013-181604

(51) Int. Cl.
| | | |
|---|---|---|
| H04B 10/00 | (2013.01) | |
| H04Q 11/00 | (2006.01) | |
| H04J 14/02 | (2006.01) | |
| H04B 10/079 | (2013.01) | |
| H04L 12/26 | (2006.01) | |
| H04J 14/00 | (2006.01) | |

(52) U.S. Cl.
CPC ..... *H04Q 11/0066* (2013.01); *H04B 10/07955* (2013.01); *H04J 14/0221* (2013.01); *H04J 14/0228* (2013.01); *H04J 14/0241* (2013.01); *H04L 43/08* (2013.01); *H04Q 2011/0016* (2013.01); *H04Q 2011/0083* (2013.01); *H04Q 2011/0086* (2013.01)

(58) Field of Classification Search
CPC .... H04B 10/07; H04B 10/075; H04B 10/077; H04B 10/0775; H04B 10/0777; H04B 10/079; H04B 10/0795; H04B 10/07955; H04J 14/0221; H04Q 2011/0083
See application file for complete search history.

(56) References Cited

U.S. PATENT DOCUMENTS

| | | | | |
|---|---|---|---|---|
| 2009/0016841 A1* | 1/2009 | Squyres | .................... | B60P 1/00 410/144 |
| 2010/0260499 A1* | 10/2010 | Izumi | ..................... | H04J 14/02 398/48 |

FOREIGN PATENT DOCUMENTS

JP  2010-245993  10/2010

OTHER PUBLICATIONS

JDSU, "A Performance Comparison of WSS Switch Engine Technologies", JDSU White Paper, pp. 1-24, May 2009.

* cited by examiner

*Primary Examiner* — Daniel Dobson
(74) *Attorney, Agent, or Firm* — Staas & Halsey LLP (57) ABSTRACT

An optical transmission device includes: a reception unit configured to receive a plurality of light beams and wavelength allocation information of optical signals included in each of the light beams; a demultiplexing unit configured to demultiplex the plurality of light beams received; a plurality of switches configured to switch between transmitting or blocking with respect to the demultiplexed plurality of light beams; a multiplexing unit configured to multiplex light beams transmitted from the plurality of switches; a monitoring unit configured to monitor an intensity of the multiplexed light beams; and a controller configured to, based on the wavelength allocation information, obtain a combination of the light beams not including the optical signals having overlapping wavelengths, and control the plurality of switches in accordance with the combination.

5 Claims, 9 Drawing Sheets

OPTICAL TRANSMISSION DEVICE AND MONITORING METHOD OF OPTICAL SIGNAL

CROSS-REFERENCE TO RELATED APPLICATION

This application is based upon and claims the benefit of priority from the prior Japanese Patent Application No. 2013-181604 filed on Sep. 2, 2013, the entire contents of which are incorporated herein by reference.

FIELD

The embodiments discussed herein are related to an optical transmission device and a monitoring method of an optical signal.

BACKGROUND

Conventionally used optical transmission systems transmit and receive optical signals among optical transmission devices having optical cross-connects (OXCs) by using the wavelength division multiplexing (WDM) method. In an optical transmission system of the WDM method, optical signals from each route are cross-connected in optical switches that make up the OXCs. Representative configurations of an optical transmission system of the WDM method include the broadcast and selector (BS) type in which input WDM signals are demultiplexed by a splitter and optical signals to be output are multiplexed by a wavelength selective switch (WSS), and the route and selector (RS) type in which input WDM signals are demultiplexed by a WSS and signals to be output are multiplexed by a WSS. In the BS type, in order to monitor input WDM signals by using an optical channel monitor (OCM), optical transmission devices have a 2×1 optical switch mounted at the stage prior to the OCM, and switch between monitored ports and monitor the wavelengths of input WDM signals. In contrast to this, in the RS type, in addition to monitoring the wavelengths of the input WDM signals, optical transmission devices also monitor optical signals that are multiplexed by a WSS and optical signals that are demultiplexed by a WSS. An RS type that uses WSSs for demultiplexing has less signal loss compared to a BS type that uses splitters for demultiplexing, and is advantageous for realizing a colorless, directionless, and contentionless (CDC) function.

In recent years, configurations in which the BS type and the RS type coexist within one optical transmission system have also been proposed. In an optical transmission system in which the BS type and the RS type coexist, optical transmission devices use a multi-input optical switch at the stage prior to an OCM in order to monitor optical signals from each port including also optical signals that are output. Thus, optical transmission devices are able to monitor the optical signals of each channel while individually selecting optical signals.

Japanese Laid-open Patent Publication No. 2010-245993 is an example of related art.

SUMMARY

According to an aspect of the invention, an optical transmission device includes: a reception unit configured to receive a plurality of light beams and wavelength allocation information of optical signals included in each of the light beams; a demultiplexing unit configured to demultiplex the plurality of light beams received; a plurality of switches configured to switch between transmitting or blocking with respect to the demultiplexed plurality of light beams; a multiplexing unit configured to multiplex light beams transmitted from the plurality of switches; a monitoring unit configured to monitor an intensity of the multiplexed light beams; and a controller configured to, based on the wavelength allocation information, obtain a combination of the light beams not including the optical signals having overlapping wavelengths, and control the plurality of switches in accordance with the combination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In order to monitor the optical signals of one port, an optical transmission device scans all wavelength bands (channels) in which there is a possibility that optical signals are present. Therefore, it is assumed that the monitoring period per one port is 500 milliseconds, for example. In a BS type that has two input/output ports, the monitoring of all monitoring-target ports is completed in 1 second (=2 ports× 500 milliseconds). In an RS type that has two input/output ports, a port for optical signals obtained by multiplexing optical signals demultiplexed by a WSS, and a port for optical signals obtained by multiplexing optical signals multiplexed by a WSS, the monitoring of all monitoring-target ports is completed in 2 seconds (=4 ports×500 milliseconds). Incidentally, in an optical transmission system in which the BS type and the RS type coexist, the number of monitored ports increases to 12, for example, and therefore the monitoring period takes approximately 6 seconds. The increase in the duration of the monitoring period causes a decrease in the speed of output level control, and therefore, together with the increase in the monitoring targets, it becomes difficult to control optical-level transient responses. When realizing new functions such as a CDC, a reconfigurable optical add-drop multiplexer (ROADM), or a Flexgrid function, this kind of problem becomes particularly prominent combined with the expected further increase in the number of ports that accompanies the increase in the number wavelengths accommodated in WDM, or the demand for the further enhancement of monitoring.

Hereafter, embodiments of an optical transmission device and a monitoring method of an optical signal with which it is possible to shorten monitoring periods for ports are described in detail with reference to the drawings. It ought to be noted that the optical transmission device and the monitoring method disclosed in the present application are not restricted by the following embodiments.

Figure 1:
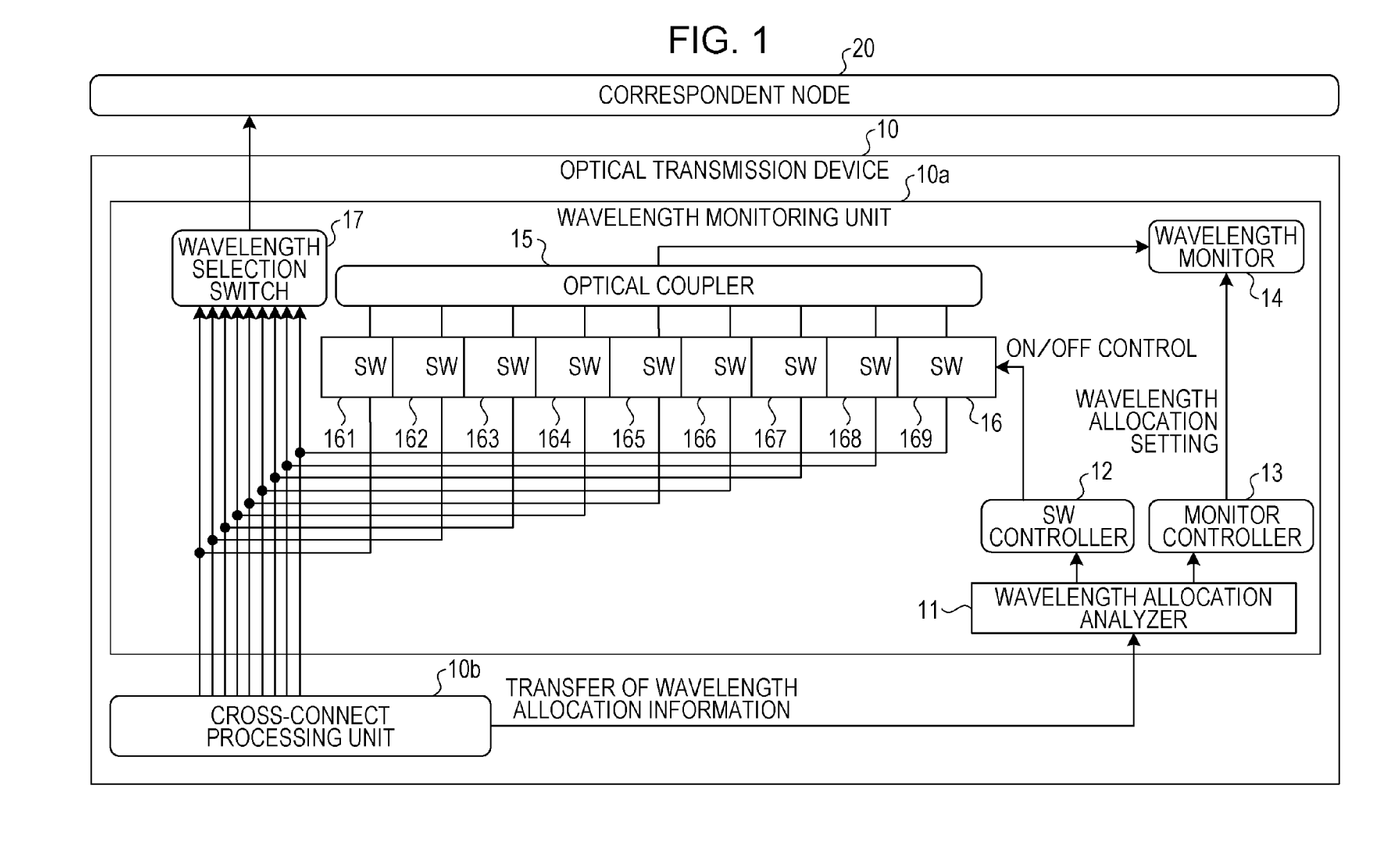
FIG. 1 is a block diagram depicting the configuration of an optical transmission device.

First, the configuration of an optical transmission device according to an embodiment disclosed in the present application is described. FIG. 1 is a block diagram depicting the configuration of an optical transmission device 10. As depicted in FIG. 1, the optical transmission device 10 has a wavelength monitoring unit 10a and a cross-connect processing unit 10b. The wavelength monitoring unit 10a is an OCM, for example, and monitors the peak power of optical signals with respect to each wavelength. The wavelength monitoring unit 10a has a wavelength allocation analyzer 11, a switch (SW) controller 12, a monitor controller 13, a wavelength monitor 14, an optical coupler 15, an on/off SW group 16, and a wavelength selection switch 17. The cross-connect processing unit 10b cross-connects optical signals from ports (not depicted in FIG. 1) of the optical transmission device 10, and the cross-connected optical signals are input to the wavelength monitoring unit 10a. The cross-connect processing unit 10b then transfers wavelength allocation information to the wavelength allocation analyzer 11. These constituent parts are connected unidirectionally or bidirectionally in such a way as to enable the input and output of signals and data.

Based on the wavelength allocation information input from the cross-connect processing unit 10b, the wavelength allocation analyzer 11 analyses whether or not there is overlapping of wavelengths among the ports. The switch (SW) controller 12 controls the on/off SW group 16. The monitor controller 13 implements wavelength allocation settings to the wavelength monitor 14. In accordance with the wavelength allocations set by the monitor controller 13, the wavelength monitor 14 monitors the wavelengths of input light beams that are input to the ports. The optical coupler 15 multiplexes input light beams that are input from the on/off SW group 16. The on/off SW group 16 has on/off SWs 161 to 169 for each port, and individually performs on/off switching control with respect to the input light beams. The wavelength selection switch 17 selects a light beam having the desired wavelength from the input light beams (WDM signals) of each port from the cross-connect processing unit 10b, and outputs the selected light beam to a correspondent node 20.

Figure 2:
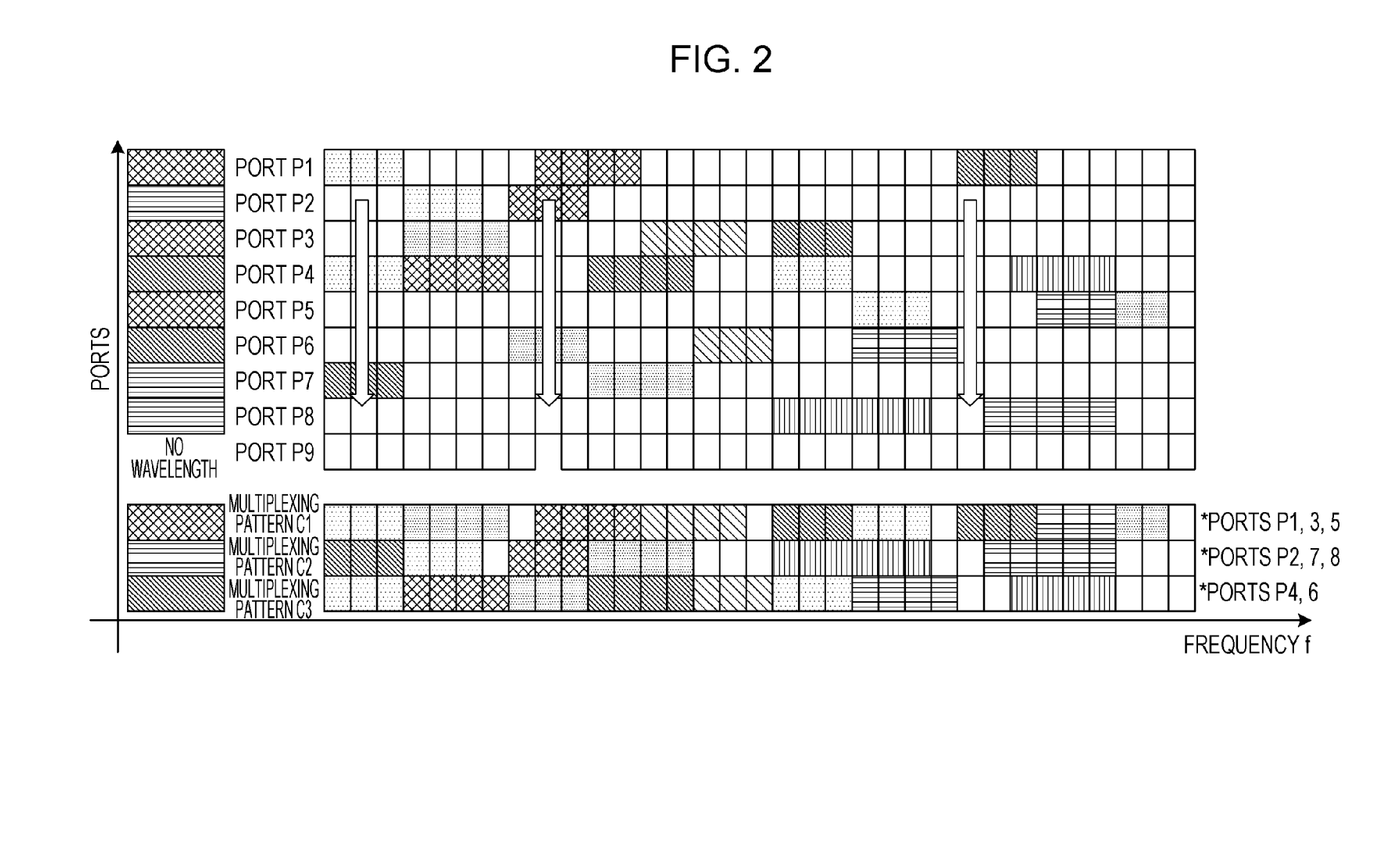
FIG. 2 is a drawing for illustrating an overview of port monitoring control performed by an optical transmission device.

FIG. 2 is a drawing for illustrating an overview of port monitoring control performed by the optical transmission device 10. Here, the case where the wave allocation information of the ports P1 to P9 is as depicted in FIG. 2 is adopted as an example, and an overview of port monitoring control executed by the optical transmission device 10 is described. The cross-connect processing unit 10b outputs, to the wavelength allocation analyzer 11, the wavelength allocation information of the ports P1 to P9 that is input to the wavelength selection switch 17. Based on the wave allocation information that is input, the wavelength allocation analyzer 11 checks for overlapping between the wavelengths of the ports P1 to P9. It ought to be noted that, although FIG. 2 depicts the case where the number of ports is nine, the number of ports may be another numerical value.

As depicted in FIG. 2, the wavelength allocation analyzer 11 checks, from the short wavelength side to the long wavelength side of input light beam that is input to the port P1, for overlapping between the wavelength of the port P1 and the wavelengths of the other the ports P2 to P9, and extracts a combination of ports in which none of the wavelengths overlap. After the checking for the port P1 has finished, the wavelength allocation analyzer 11 executes the same overlapping checking, in order, also for the other the ports P2 to P9.

Next, the wavelength allocation analyzer 11 sets, as a multiplexing pattern C1, the combination that has the highest number of ports having wavelengths that do not overlap, or in other words, the combination of ports capable of accommodating wavelengths with the least blank wavelengths. In FIG. 2, the three ports P1, P3, and P5 are set as the multiplexing pattern C1. At such time, if there are a plurality of combinations of ports having the same highest number of ports, the wavelength allocation analyzer 11 preferentially adopts the combination of ports having the lower port numbers. For example, in the case where there are two combinations that have the highest number of three ports such as the combinations of the ports P1, P3, and P5 and the ports P2, P7, and P8, the combination of the three ports P1, P3, and P5 that have the lower port numbers is selected as the multiplexing pattern C1.

Next, the wavelength allocation analyzer 11 excludes the ports included in the multiplexing pattern C1, and re-executes the aforementioned processing. In other words, the wavelength allocation analyzer 11 sets the combination that has the highest number of ports having wavelengths that do not overlap as a multiplexing pattern C2. In FIG. 2, the other three ports P2, P7, and P8 are set as the multiplexing pattern C2. The wavelength allocation analyzer 11 repeatedly executes the same procedure until there are no ports having overlapping wavelengths. As a result, in the example depicted in FIG. 2, the ports P4 and P6 become a multiplexing pattern C3.

The monitor controller 13 implements settings in such a way that the wavelength allocation information set to the wavelength monitor 14 periodically switches based on the three types of wavelength allocation information extracted. The SW controller 12 controls the on/off SW group 16 in such a way that optical signals that are output from the ports of the types extracted are multiplexed by the optical coupler 15. For example, the multiplexing of the optical signals of the ports P1, P3, and P5 is performed by the switches corresponding to the ports P1, P3, and P5 being set to on (connected state), and the switches corresponding to the other the ports P2, P4, and P6 to P8 being set to off (disconnected state).

Figure 3:
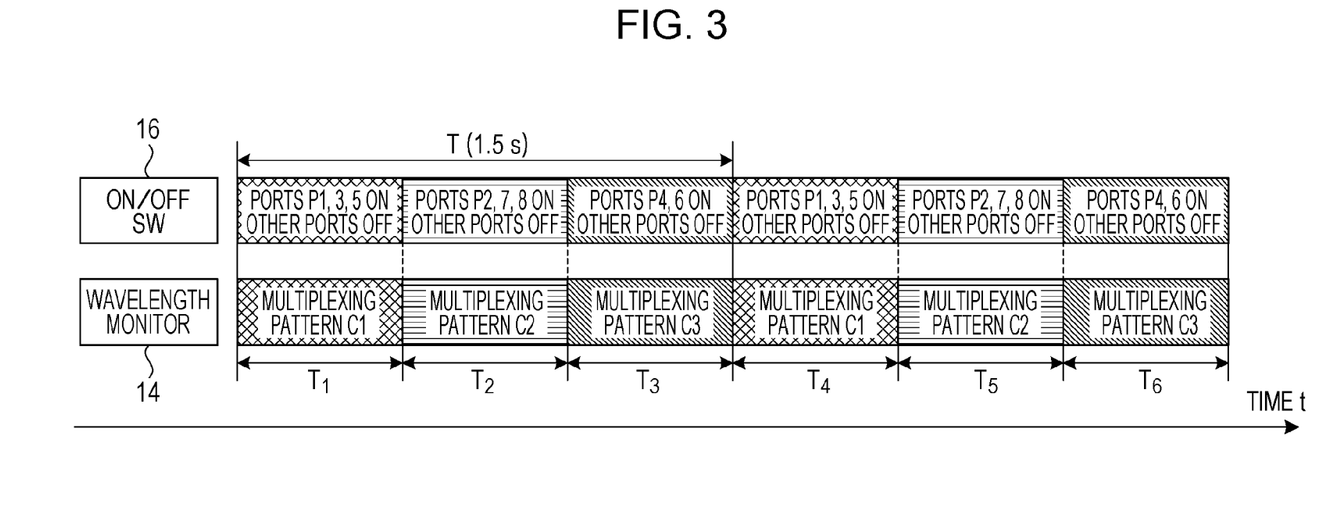
FIG. 3 is a drawing depicting the way in which each port is periodically monitored by port switching control.

FIG. 3 is a drawing depicting the way in which each port is periodically monitored by the port switching control. As depicted in FIG. 3, the wavelength monitor 14 monitors the wavelengths of the optical signals of each port in the on state by using the on/off SW group 16. For example, in times $T_1$ and $T_4$, the ports P1, P3, and P5 are in the on state, and therefore the multiplexing pattern C1, which constitutes the multiplexing of the optical signals of the ports P1, P3, and P5, becomes the monitoring target. Furthermore, in times $T_2$ and $T_5$, the ports P2, P7, and P8 are in the on state, and therefore the multiplexing pattern C2 of the optical signals of the ports P2, P7, and P8 becomes the monitoring target. In addition, in times $T_3$ and $T_6$, the ports P4 and P6 are in the on state, and therefore the multiplexing pattern C3 of the optical signals of the ports P4 and P6 becomes the monitoring target.

It ought to be noted that the monitoring times $T_1$ to $T_6$ of the multiplexing patterns C1 to C3 are 0.5 seconds each, for example. The port monitoring period T in this case is the sum of the monitoring times $T_1+T_2+T_3$, and therefore becomes 1.5 seconds.

As previously mentioned, the optical transmission device 10 determines a combination of ports to be multiplexing targets from among all the ports P1 to P9 in such a way that wavelengths do not overlap among ports. At such time, the optical transmission device 10 groups together as many ports as possible into one multiplexing pattern, and thereby reduces the number of monitoring-target port groups (number of multiplexing patterns) to the minimum. For example, in the example depicted in FIG. 2, the number of combinations of ports that are able to be multiplexed is "three", and therefore, if the ports that do not have a wavelength (port P9) are set to not be monitored, the number of monitoring-target ports is reduced from nine ports to three port groups (multiplexing patterns C1 to C3). Thus, the monitoring time per port group (multiplexing pattern) increases. As a result, monitoring accuracy improves.

First Embodiment

Figure 4:
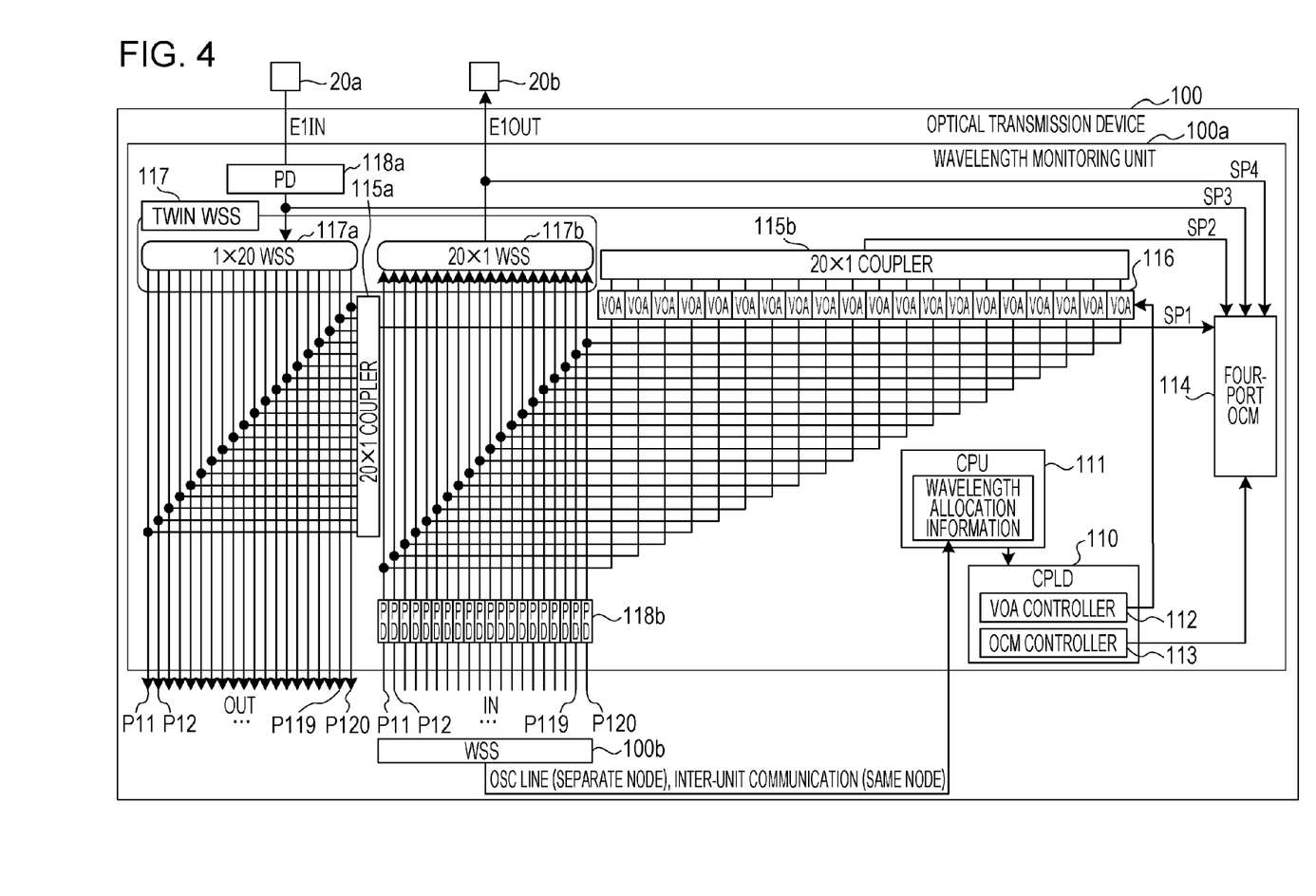
FIG. 4 is a block diagram depicting the configuration of an optical transmission device according to the first embodiment.

Hereafter, an optical transmission device 100 according to the first embodiment is described with reference to FIG. 4 to FIG. 8. FIG. 4 is a block diagram depicting the configuration of the optical transmission device 100 according to the first embodiment. As depicted in FIG. 4, the optical transmission device 100 has a wavelength monitoring unit 100a and a wavelength selective switch (WSS) 100b for each route. The wavelength monitoring unit 100a has a complex programmable logic device (CPLD) 110 and a central processing unit (CPU) 111. The CPLD 110 has a variable optical attenuator (VOA) controller 112 and an OCM controller 113. The wavelength monitoring unit 100a also has a four-port OCM 114, 20×1 couplers 115a and 115b, VOAs 116, a twin WSS 117 (117a and 117b), and a photo diode (PD) 118a, photo diodes (PDs) 118b. These constituent parts are connected unidirectionally or bidirectionally in such a way as to enable the input and output of signals and data. It ought to be noted that the VOAs 116 are configured from a plurality of VOAs, and the PDs 118b are configured from a plurality of PDs.

Based on the wavelength allocation information of each route, the CPU 111 controls the CPLD 110 by using control-purpose firmware. The CPU 111 may be a field programmable gate array (FPGA) or the like. The VOA controller 112 has an interface for the VOAs 116. The OCM controller 113 has an interface for the four-port OCM 114. The four-port OCM 114 has four scan ports (SP1 to SP4), and monitors wavelengths that have been set with respect to the scan ports. The 20×1 couplers 115a and 115b multiplex the input light beams of 20 ports (P11 to P120) and output the multiplexed light beam. The VOAs 116 attenuate the output level of the input light beams by on/off control. A 1×20 WSS 117a of the twin WSS 117 selects a light beam having a desired wavelength from input light beams (WDM signals) from a correspondent node (CN) 20a, and outputs the selected light beam to the 20×1 coupler 115a. Furthermore, a 20×1 WSS 117b of the twin WSS 117 selects the wavelength of a light beam (WDM signal) output to a correspondent node 20b, and outputs an optical signal of that wavelength. The PD 118a and the PDs 118b monitor the total power of the input light beams.

As previously mentioned, the optical transmission device 100, in order to correspond to 12 routes for example, has WSSs for 20 ports. Furthermore, the optical transmission device 100 is of the RS type, and therefore has WSS modules at each of the add side and the drop side. The 1×20 WSS 117a outputs a light beams having an arbitrarily selected wavelength from WDM signals that are input from E1IN, to out-ports P11 to P120. These ports are dropped by the node itself (optical transmission device 100), or are hub-connected to other routes. A plurality of add input signals that are dependent upon the configuration of the optical transmission system, and a plurality of through/hub signals from other routes are input to in-ports P11 to P120. The 20×1 WSS 117b selects an optical signal of an arbitrary wavelength from among the input signals, and outputs the selected optical signal to E1OUT to thereby transmit the selected optical signal to another node.

In the first embodiment, the targets for wavelength monitoring performed by the optical transmission device 100 are E1IN, E1OUT, the out-ports P11 to P120, and the in-ports P11 to P120. It ought to be noted that, although a four-port scan-type OCM is depicted in FIG. 4 as an example of the wavelength monitoring unit 100a, this may be substituted by a 1×4 SW and a one-port OCM.

The WDM signals of E1IN and E1OUT are input to SP3 and SP4 of the four-port OCM 114 and become monitoring targets. The WDM signals output from the out-ports P11 to P120 are signals that have been subjected to wavelength selection by the 1×20 WSS 117a and do not have overlapping wavelengths, and therefore the signals that have been multiplexed by the 20×1 coupler 115a are input to SP1 of the four-port OCM 114 and become monitoring targets. Furthermore, a plurality of add signals, a through/hub signal from the transmission system of the RS type, and a through/hub signal from the transmission system of the BS type are input to the in-ports P11 to P120.

The optical transmission device 100 has the VOAs 116 at the stage prior to the 20×1 coupler 115b with respect to the WDM signals that are input from the in-ports P11 to P120. The optical transmission device 100 multiplexes only optical signals of ports having wavelengths that do not overlap, by using the VOAs 116 controlled by the VOA controller 112 with respect to the WDM signals that are input from the in-ports P11 to P120, and monitors the WDM signals of all ports by periodically switching between monitoring-target ports. It ought to be noted that the VOAs 116 are used so that WDM signals of ports having overlapping wavelengths are not multiplexed, and therefore may be substituted by a device having a simple on/off function.

Here, the correlation between the constituent elements depicted in FIG. 1 and the constituent elements of FIG. 4 according to the first embodiment are described. In FIG. 1 and FIG. 4, reference numerals having the same endings are appended to corresponding constituent elements. In other words, the wavelength allocation analyzer 11 of FIG. 1 corresponds to the CPU 111, and the SW controller 12 corresponds to the VOA controller 112. Furthermore, the monitor controller 13 corresponds to the OCM controller 113, and the wavelength monitor 14 corresponds to the four-port OCM 114. In addition, the optical coupler 15 corresponds to the 20×1 couplers 115a and 115b, and the on/off SW group 16 corresponds to the VOAs 116. The wavelength selection switch 17 corresponds to the twin WSS 117.

Figure 5:
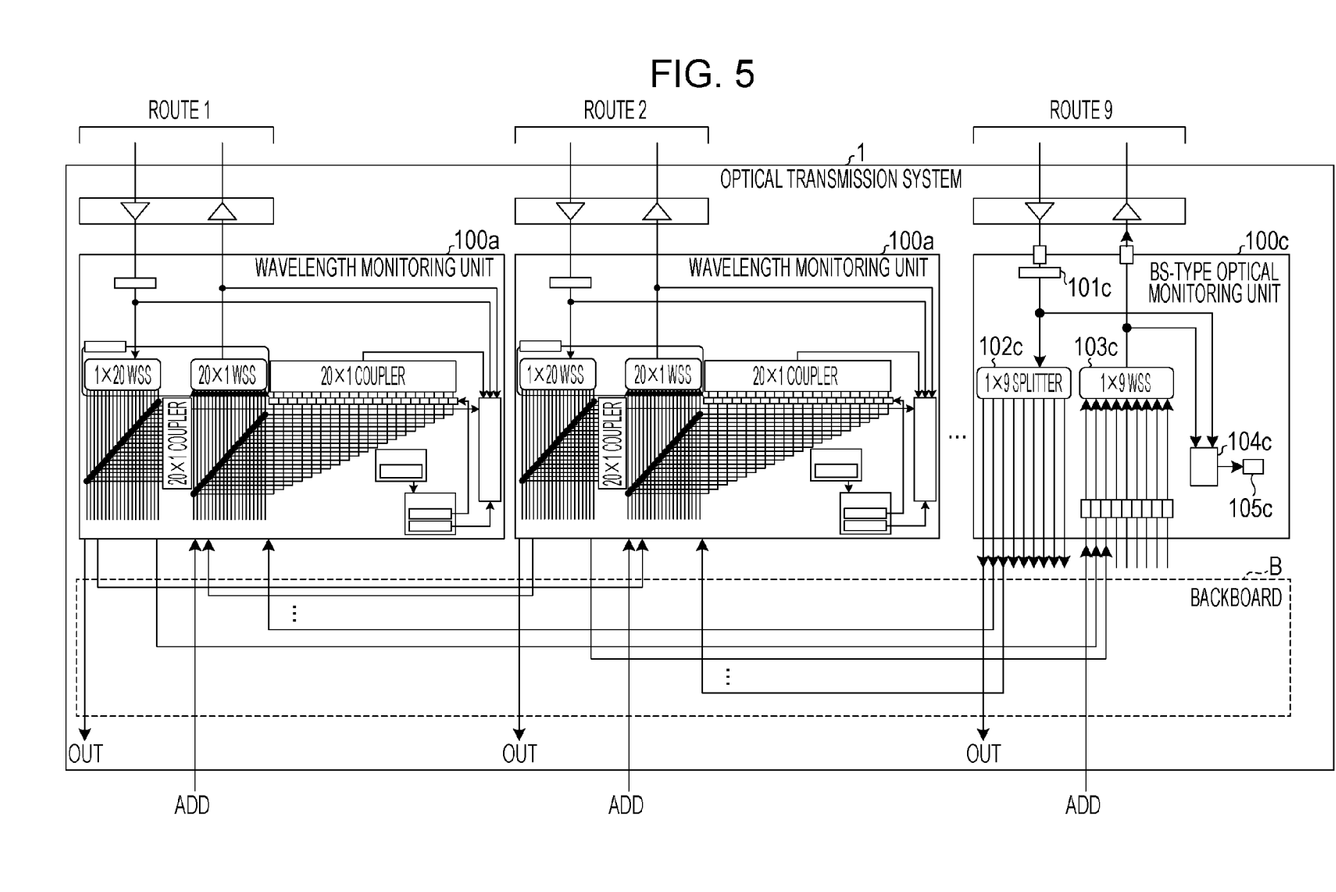
FIG. 5 is a drawing depicting the configuration of an optical transmission system according to the first embodiment.

FIG. 5 is a drawing depicting the configuration of the optical transmission system 1 according to the first embodiment. As depicted in FIG. 5, in the optical transmission system 1, an RS type and a BS type coexist, and a BS-type optical monitoring unit 100c is incorporated as well as the wavelength monitoring unit 100a depicted in FIG. 4. The wavelength monitoring unit 100a has already been described and therefore a detailed description thereof is omitted. The BS-type optical monitoring unit 100c has a PD 101c, a 1×9 splitter 102c, a 1×9 WSS 103c, a 2×1 SW 104c, and an OCM 105c. The BS-type optical monitoring unit 100c monitors the power of WDM signals with respect to each wavelength by adopting one-port input for the OCM 105c, and having the 2×1 SW 104c mounted at the stage prior thereto and switching between input and output.

Figure 6:
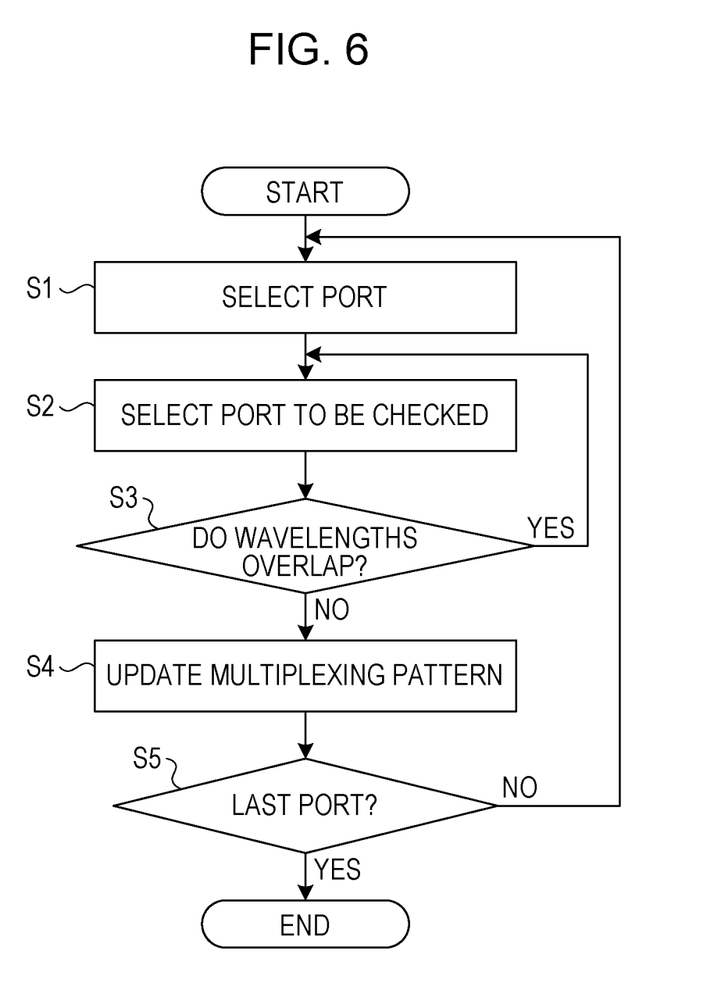
FIG. 6 is a flowchart for illustrating the operation of an optical transmission device.

Next, the operation is described. FIG. 6 is a flowchart for illustrating the operation of the optical transmission device 100. In S1, the CPU 111 selects, in the ascending order of the port numbers, a port from among the twenty ports P11 to P120. In the first pass, the port P11 is selected. In S2, the CPU 111 selects ports to be checking targets for wavelength overlapping. In the first pass, the ports P12 to P120 are selected in order. In S3, the CPU 111 determines whether or not there is any wavelength overlapping between the port selected in S1 and the ports selected in S2.

If as a result of the determination the wavelengths of the selected ports overlap (S3: yes), it is not possible for the selected ports to be set as the same combination, and therefore the CPU 111 changes the ports to be checking targets to the next ports (S2). In contrast to this, if as a result of the determination in the aforementioned S3 the wavelengths of the selected ports do not overlap (S3: no), it is possible for the selected ports to be set as the same combination. Therefore, the CPU 111 updates the multiplexing pattern by incorporating the ports selected in S2 into the same multiplexing pattern as the port selected in S1 (S4).

After the update, the CPU 111 determines whether or not the port selected in S1 is the last port (S5). If as a result of the determination the port selected in S1 is the last port (port P120 in the present embodiment) (S5: yes), the series of processing is finished, and if not the last port (S5: no), processing returns to S1 and the processing thereafter is repeatedly executed. Thus, the optical transmission device 100 is able to group together as many ports as possible into one multiplexing pattern without wavelengths overlapping among the ports P11 to P120. As a result, the monitoring-target port groups (multiplexing patterns) are reduced to the minimum value ("four" in the present embodiment).

Figure 7:
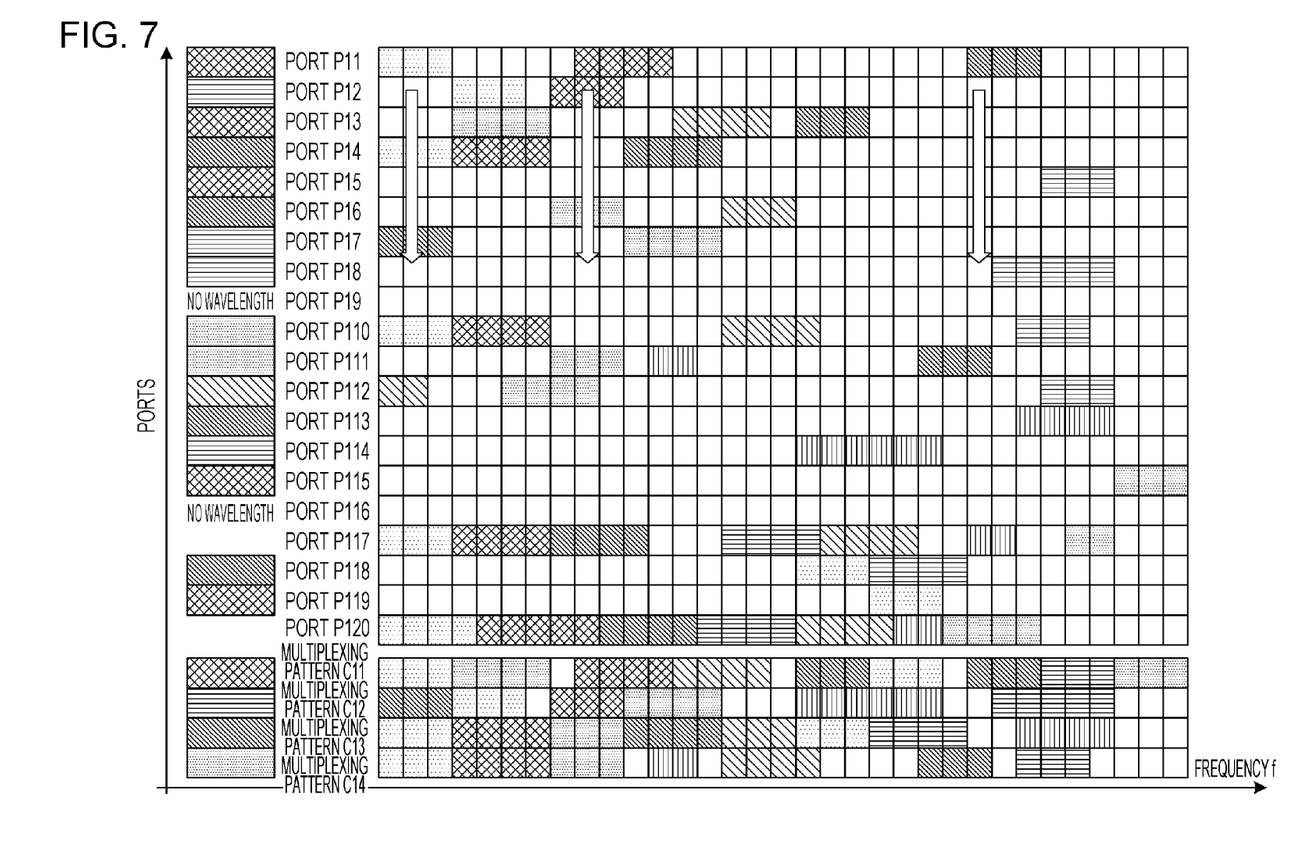
FIG. 7 is a drawing for illustrating a process in which a CPU of an optical transmission device specifies and multiplexes a combination of ports having wavelengths that do not overlap.

Next, the port monitoring control method according to the first embodiment is described in further detail with reference to FIG. 7 and FIG. 8. The CPU 111 of the optical transmission device 100 uses an optical supervisory channel (OSC) line and media access control (MAC)/user datagram protocol (UDP) frame communication, and acquires the wavelength allocation information of each route in the in-ports P11 to P120. Furthermore, the CPU 111 acquires, MAC/UDP frame communication, the wavelength allocation information of the node itself (optical transmission device 100) in E1IN, E1OUT, and the out-ports P11 to P120.

Based on the wavelength allocation information of each route, the CPU 111 checks for overlapping among ports. FIG. 7 is a drawing for illustrating a process in which the CPU 111 of the optical transmission device 100 specifies and multiplexes a combination of ports having wavelengths that do not overlap. In FIG. 7, the frequency f is specified by the x-axis, and the ports are specified by the y-axis. First, the CPU 111 checks for wavelength overlapping from the short wavelength side that is the port P11, and specifies ports in which none of the wavelengths are overlapping. The CPU 111 performs the same processing also for the other ports P12 to P120, and by the overlapping wavelength checking, specifies ports having wavelengths that are not overlapping. The CPU 111 sets the combination that has the highest number of ports having wavelengths that do not overlap as the multiplexing pattern C11. In the present embodiment, the ports P11, P13, P15, P115, and P119 become the combination of ports that make up the multiplexing pattern C11. It ought to be noted that if there are a plurality of combinations of ports having the highest number, the combination having the lower port numbers is selected, for example.

When the combination of ports in the multiplexing pattern C11 are determined, the CPU 111 excludes the port group (in the present embodiment, the ports P11, P13, P15, P115, and P119) making up the multiplexing pattern C11, and once again searches for a combination of ports that has the highest number of ports having wavelengths that do not overlap. As a result of the search, in the present embodiment, the ports P12, P17, P18, and P114 are determined as a combination of ports making up a multiplexing pattern C12. The CPU 111 performs wavelength overlapping checking also for the remaining ports by using the same procedure, and, when there are no longer any ports having overlapping wavelengths, settles on the combinations of ports that are able to be multiplexed.

In the present embodiment, besides the ports P11, P13, P15, P115, and P119, and the ports P12, P17, P18, and P114, the ports P14, P16, P113, and P118, and the ports P110 and P111 are selected as combinations of ports that are able to be multiplexed. As a result, there are four port combinations, namely the multiplexing patterns C11 to C14. Furthermore, the ports P112, P117, and P120 become ports for which there are no combination counterparts (independent wavelength ports). Consequently, when the four-port OCM 114 does not perform monitoring for the ports P9 and P116 in which there are no wavelengths, the number of monitoring-target ports and port groups is reduced to seven from the original 20.

Figure 8:
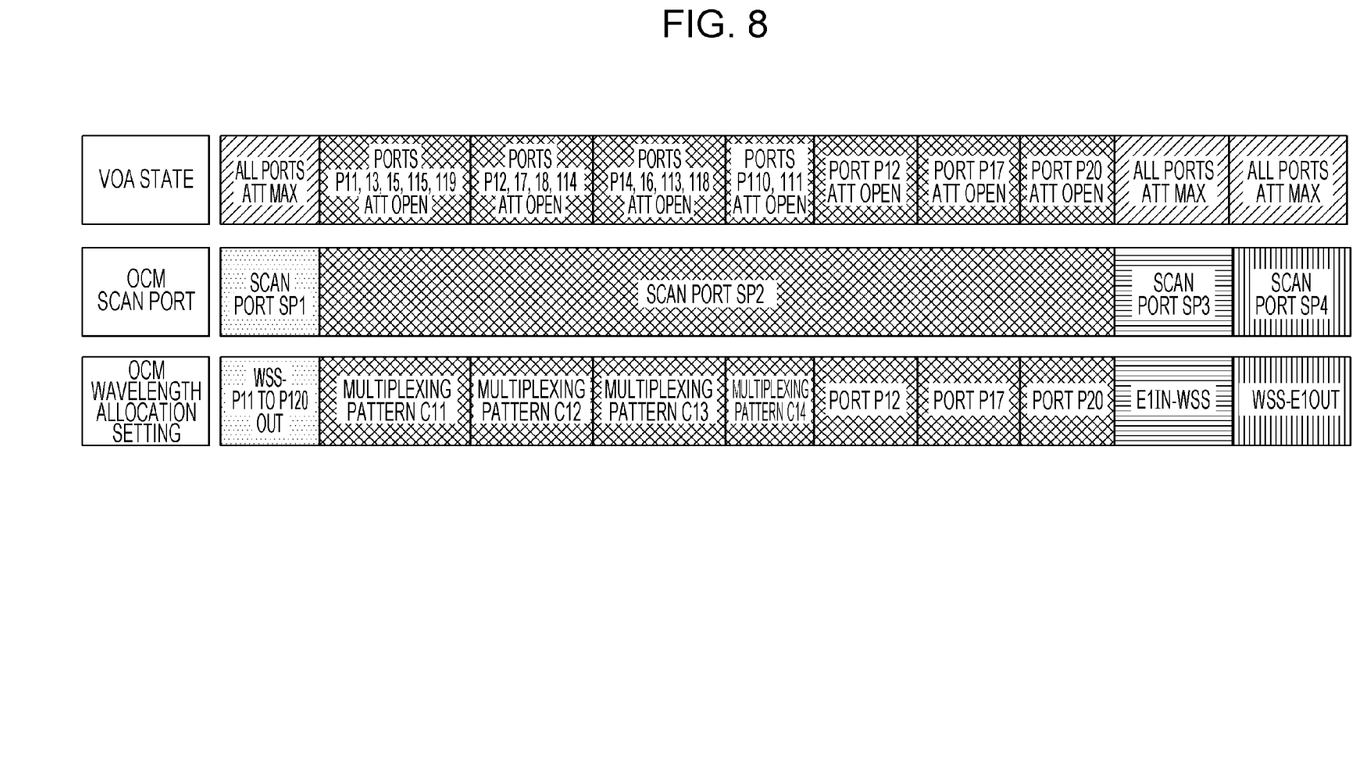
FIG. 8 is a drawing for illustrating a process in which a CPLD of an optical transmission device monitors multiplexed ports.

FIG. 8 is a drawing for illustrating a process in which the CPLD 110 of the optical transmission device 100 monitors multiplexed ports. First, the CPLD 110 of the optical transmission device 100 sets the wavelength allocation information of the scan ports, in the four-port OCM 114. In other words, as depicted in FIG. 8, the CPLD 110 sets, with respect to the scan port SP1, "P11 to P120 out" as the wavelength allocation information of WSS signals that are output to the ports P11 to P120. Furthermore, the CPLD 110 sets, with respect to the scan port SP2, seven types of wavelength information (multiplexing patterns C11 to C14, and the ports P12, P17, and P20) determined in the aforementioned processing, in such a way that switching is possible in a predetermined period. In addition, the CPLD 110 sets, with respect to the scan port SP3, "E1IN-WSS" as the wavelength allocation information of WSS signals that are input to E1, and with respect to the scan port SP4, sets "WSS-E1OUT" as the wavelength allocation information of WSS signals that are output to E1.

Next, the VOA controller 112 of the optical transmission device 100 controls the VOAs 116, and by using the 20×1 couplers 115a and 115b, multiplexes optical signals of the combinations of ports determined in the aforementioned processing. For example, as depicted in FIG. 8, the VOA controller 112 connects the VOAs 116 of the ports P11, P13, P15, P115, and P119, and disconnects the other ports. Thus, the multiplexing pattern C11 is generated. Likewise, the VOA controller 112 generates the multiplexing pattern C12 by connecting the VOAs 116 of the ports P12, P17, P18, and P114, and disconnecting the other ports.

The four-port OCM 114 monitors only the wavelengths that have been subjected to wavelength allocation setting in the scan ports SP1 to SP4. From among the scan ports SP1 to SP4, a monitoring value acquired by the scan port SP2 is used as a wavelength monitoring result by carrying out redistribution from the wavelength allocation information of the ports P11 to P120. The acquired monitoring value, for example, is used for confirming whether or not optical signals are being input normally (for example, whether there is input leakage due to a faulty connection and so forth), or for pre-emphasis control for tilt correction. Hereafter, the pre-emphasis control is described. Optical transmission devices are able to transmit optical signals to transmission destinations that are different for each wavelength; however, there are cases where the number of times that relaying is performed and the transmission distance differ due to the transmission route of an optical signal. In such cases, a deviation (hereafter referred to as "tilt") in the power level among wavelengths occurs. As a result, there are cases where, in a receiving-side optical transmission device, the tilt does not fall within the range (dynamic range) of the optical signal output level that is able to be received. An optical signal having a power level outside of the dynamic range is an optical signal having a wavelength that is not able to be received, and therefore causes packet loss and so forth. Therefore, in order to reduce the tilt, when receiving an optical signal, the optical transmission device monitors the power level of optical signals with respect to each wavelength, and equalizes the power level by pre-emphasis control. In other words, the optical transmission device adjusts the output power level by using the acquired monitoring value to correct the tilt.

As previously described, the optical transmission device 100 has the each-route WSS 100b, the four-port OCM 114, the CPU 111, the VOAs 116, and the 20×1 couplers 115a and 115b. The each-route WSS 100b switches the wavelengths of the optical signals (WDM signals) that are input and output (the input being drop signals and the output being add signals) with other optical transmission devices 20a and 20b, and also has the plurality of ports P11 to P120 that input the optical signals in each of the wavelengths. The four-port OCM 114 monitors the optical signals of the wavelengths that are switched by the each-route WSS 100b. Based on the result of the monitoring performed by the four-port OCM 114, the CPU 111 extracts a combination of ports having wavelengths that do not overlap one another from among the plurality of ports P11 to P120. The VOAs 116 perform control to output (transmit) the optical signals input to the combination of ports extracted by the CPU 111, and also block the optical signals input to ports other than the aforementioned combination. The 20×1 couplers 115a and 115b input the optical signals output from the aforementioned combination of ports in accordance with the control performed by the VOAs 116, multiplex the optical signals, and output the multiplexed optical signals to the four-port OCM 114.

In other words, the optical transmission device 100 has the PD 118a and the PDs 118b, the WSSs 117a and 117b, the CPU 111, the VOAs 116, the 20×1 coupler 115b, the four-port OCM 114, and the CPLD 110 including the VOA controller 112 and the OCM controller 113. The PD 118a and the PDs 118b receive, from outside, a plurality of input light beams and wavelength allocation information of optical signals included in each of the input light beams. The 1×20 WSS 117a demultiplexes at least one of the input light beams into first signal light beams bound for the 20×1 coupler 115a, and demultiplexes each of the other input light beams into a plurality of second signal light beams. The CPU 111 extracts some of the first signal light beams and some of the second signal light beams. The VOAs 116 perform switching between transmitting or blocking with respect to the optical signals input to the combination of ports extracted by the CPU 111. The 20×1 coupler 115b multiplexes transmitted light beams from the VOAs 116, and outputs a multiplexed signal in which the transmitted light beams have been multiplexed. The four-port OCM 114 measures the strength of the optical signals by using the multiplexed signal. The VOA controller 112, based on the wavelength allocation information, obtains a combination of the input light beams not including a plurality of the optical signals having overlapping wavelengths, and controls the VOAs 116 in accordance with the combination.

More specifically, the optical transmission device 100 has one or more first ports (E1IN), one or more second ports (IN), and a third port (E1OUT). The one more first ports receive a wavelength-multiplexed first input light beam from outside, and wavelength allocation information of optical signals included in the first input light beam. The received first input light beam is demultiplexed for each wavelength, and a plurality of demultiplexed first signal light beams are output. The one more second ports receive a wavelength-multiplexed second input light beam from outside, and wavelength allocation information of optical signals included in the second input light beam. The received second input light beam is demultiplexed using an optical coupler, and a plurality of demultiplexed second signal light beams are output. The third port receives one or more of the first signal light beams and one or more of the second signal light beams, and from among the optical signals included in the first signal light beams and the second signal light beams, transmits all or some of the optical signals to the outside. The optical transmission device 100 has one or more of the 1×20 WSS 117a, one or more of the 20×1 WSS 117b, the 20×1 coupler 115b, the four-port OCM 114, and the VOA controller 112. The one or more 1×20 WSSs 117a have a first extracted light beam, for which some of the first signal light beams are extracted, input thereto, and switch between transmitting or blocking the first extracted light beam. The one or more 20×1 WSSs 117b have a second extracted light beam, for which some of the second signal light beams are extracted, input thereto, and switch between transmitting or blocking the second extracted light beam. The 20×1 coupler 115b multiplexes one or more first transmitted light beams output from the 1×20 WSSs 117a and one or more second transmitted light beams output from the 20×1 WSSs 117b, and outputs a multiplexed signal. The four-port OCM 114 measures the strength of the optical signals by using the multiplexed signal. The VOA controller 112, based on the plurality of items of wavelength allocation information, obtains, from among all combinations of the first signal light beams and the second signal light beams, a non-multiplexed combination from which combinations that include a plurality of the optical signals having overlapping wavelengths are omitted, and controls the 1×20 WSSs 117a and the 20×1 WSSs 117b in accordance with the non-multiplexed combination.

Due to the aforementioned configuration, the optical transmission device 100 is able to reduce monitoring targets by multiplexing, and shorten the monitoring period. As a result, the speed of the output level control improves, and it is possible for the control of optical-level transient responses to be realized with ease. The effect differs depending on the wavelengths of the optical signals that are input; however, if the OCM scanning period is set as 500 milliseconds, the optical transmission device 100 according to the present embodiment is able to shorten the monitoring period from approximately 10 seconds to approximately 500 milliseconds at most. Furthermore the optical transmission device 100 may set the monitoring period (for example, two seconds) within the range of 500 milliseconds to 10 seconds as a system specification, and may adopt a system configuration corresponding with that period.

Furthermore, in the optical transmission device 100, the CPU 111 may use wavelength allocation information that indicates, for each of the ports P11 to P120 of the each-route WSS 100b, which wavelengths from among the wavelengths of the optical signals are allocated to the ports, to calculate combinations of the ports. Thus, the optical transmission device 100 acquires wavelength allocation information from the other optical transmission devices 20*a* and 20*b* of each route (port) by the OSC line and inter-unit communication. Consequently, the CPU 111 of the optical transmission device 100 is able to realize optimal monitoring control with respect to the four-port OCM 114 and the VOAs 116.

In addition, in the optical transmission device 100, the VOAs 116 may perform control to periodically switch between combinations of ports (multiplexing patterns C11 to C14) that output optical signals to be targeted for multiplexing by the 20×1 couplers 115*a* and 115*b*. Thus, it becomes possible to monitor all ports of the each-route WSS 100*b*.

Second Embodiment

Figure 9:
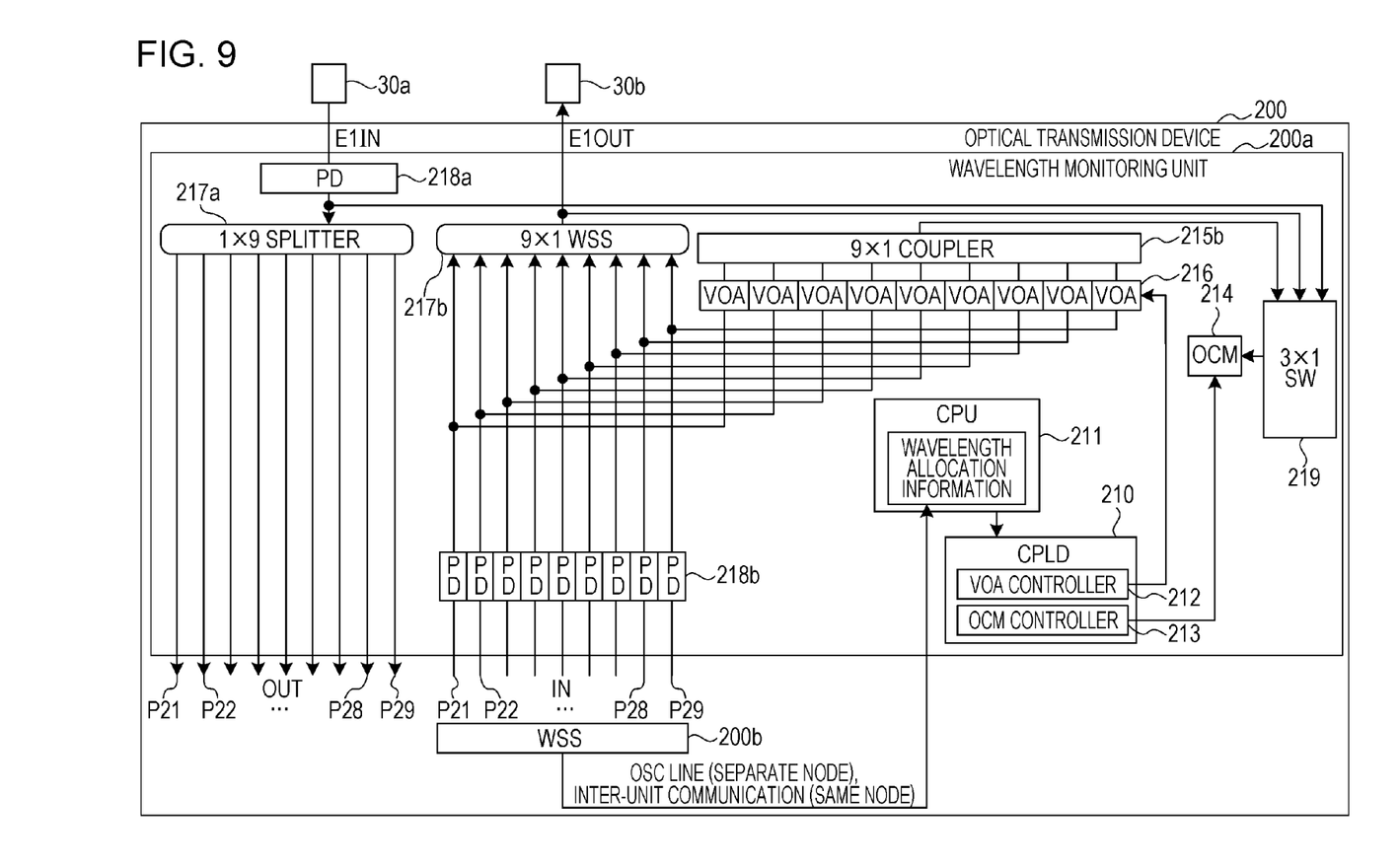
FIG. 9 is a block diagram depicting the configuration of an optical transmission device according to the second embodiment.

Next, the second embodiment is described with reference to FIG. 9. FIG. 9 is a block diagram depicting the configuration of an optical transmission device 200 according to the second embodiment. As depicted in FIG. 9, the optical transmission device 200 according to the second embodiment has the same configuration as the optical transmission device 100 according to the first embodiment depicted in FIG. 4 except for having a 1×9 splitter 217*a* and a 3×1 SW 219. Consequently, in the second embodiment, reference numerals having the same endings are used for constituent elements that are common with the first embodiment, and depictions and detailed descriptions thereof have been omitted.

The second embodiment is different from the first embodiment with regard to the configuration of the WDM optical transmission system. Specifically, in the first embodiment, as an optical transmission system in which a BS type and an RS type coexist, a description has been given with regard to the case where a BS type is applied in a known RS type. In the second embodiment, contrary to the first embodiment, an optical transmission system in which an RS type is applied in a known BS type is adopted as an example, and a description is given focusing on the differences with the first embodiment.

An OCM 214 corresponds to the four-port OCM 114 according to the first embodiment; however, the OCM 214 is a one-port type OCM module, and monitors the wavelength set for the one port. The 3×1 SW 219 sequentially switches between the signals of the monitoring-target port, and inputs the signals to the OCM 214. The 1×9 splitter 217*a* is an optical demultiplexer that demultiplexes WDM signals input from the PD 218*a*.

As depicted in FIG. 9, the optical transmission device 200 according to the present embodiment is a BS type, and therefore has a 9×1 WSS 217*b* at the add side, and the 1×9 splitter 217*a* at the drop side. The 1×9 splitter 217*a* demultiplexes WDM signals input from E1IN, and outputs the demultiplexed WDM signals to out-ports P21 to P29. These ports are dropped by the node itself (optical transmission device 200), or are hub-connected to other routes. A plurality of add input signals that are dependent upon the configuration of the optical transmission system, and a plurality of through/hub signals from other routes are input to in-ports P21 to P29. The 9×1 WSS 217*b* selects an optical signal of an arbitrary wavelength from among the input signals, and outputs the selected optical signal to E1OUT to thereby transmit the selected optical signal to another node.

In the second embodiment, the targets for wavelength monitoring performed by the optical transmission device 200 are E1IN, E1OUT, and the in-ports P21 to P29. It ought to be noted that the out-ports P21 to P29 only demultiplex WDM signals input from E1IN, and are therefore not monitoring targets in the present embodiment. The WDM signals of E1IN and E1OUT are input to the scan ports of the 3×1 SW 219. A plurality of add signals, a through/hub signal from the RS type, and a through/hub signal from the BS type are input to the in-ports P21 to P29.

The optical transmission device 200 has VOAs 216 at the stage prior to a 9×1 coupler 215*b* in the ports P21 to P29. The optical transmission device 200, in the in-ports P21 to P29, multiplexes only optical signals of ports having wavelengths that do not overlap by controlling the VOA 216*s* by using a VOA controller 212, and monitors all ports by periodically switching between monitoring-target ports. It ought to be noted that the VOAs 216 are used so that WDM signals of ports having overlapping wavelengths are not multiplexed, and therefore may be substituted by a device having a simple mechanical OPT on/off function.

Other operations such as the specific port monitoring control method are the same as the operations of the optical transmission device 100 according to the first embodiment, and therefore the depiction and description thereof therefore been omitted.

Owing to the optical transmission device 200 according to the second embodiment, it becomes possible to monitor in-ports (network-side direction), which has been difficult to realize with a conventional BS-type system configuration. Thus, the optical transmission device 200 is able to enhance the monitoring of faulty connections. As a result, the reliability of the optical transmission system improves.

It ought to be noted that, in the aforementioned embodiments, a mesh-type WDM optical transmission system has been envisaged and described; however, the connection modes of the OXCs are not restricted to a mesh type, and, for example, may be a tree type or a star type or the like. Furthermore, as with the degree indicating the degree of freedom for route selection, the maximum number of routes of the OXCs is not restricted to eight and may be nine or more. In addition, in the aforementioned embodiments, the number of ports of the entire optical transmission device is "20" in the first embodiment and is "nine" in the second embodiment; however, these may be other numerical values. For the number of ports targeted for multiplexing to the multiplexing patterns (for example, five ports in the multiplexing pattern C11), or the number of ports having independent wavelengths (for example, three ports in the first embodiment), it is also possible to adopt an arbitrary value with the number of ports of the entire device serving as an upper limit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device comprising:
   a reception unit configured to receive a plurality of light beams and wavelength allocation information of optical signals included in each of the light beams;
   a demultiplexing unit configured to demultiplex the plurality of light beams received;
   a plurality of switches configured to switch between transmitting or blocking with respect to the demultiplexed plurality of light beams;

a multiplexing unit configured to multiplex light beams transmitted from the plurality of switches;

a monitoring unit configured to monitor an intensity of the multiplexed light beams; and a controller configured to, based on the wavelength allocation information, obtain a combination of the light beams not including the optical signals having overlapping wavelengths, and control the plurality of switches in accordance with the combination.

2. The optical transmission device according to claim 1, wherein the wavelength allocation information is information that indicates which wavelengths from among the wavelengths of the optical signals are allocated.

3. The optical transmission device according to claim 1, wherein the plurality of switches perform control to periodically switch between combinations of optical signals to be subjected to multiplexing by the multiplexing unit.

4. An optical transmission device comprising:

one or more first ports, each that receive a wavelength-multiplexed first light beam and first wavelength allocation information of optical signals included in the first light beam, the received first light beam being demultiplexed for each wavelength, and the demultiplexed first light beam being transferred as a first signal light beam;

one or more second ports, each that receive a wavelength-multiplexed second light beam and second wavelength allocation information of optical signals included in the second light beam;

one or more second coupler, each that demultiplexes the received second input beam the demultiplexed second light beam being transferred as a second signal light beam;

a third port that receives one or more of the first signal light beams and one or more of the second signal light beams, and from among optical signals included in the first signal light beams and the second signal light beams, transfers all or some of the optical signals;

one or more first switches, each configured to switch between transmitting or blocking the first signal light beam;

one or more second switches, each configured to switch between transmitting or blocking the second signal light beam;

a controller configured to, based on the first wavelength allocation information and the second wavelength allocation information, obtains, from among combinations of optical signals included in the first signal light beam and optical signals included in the second signal light beam, a combination from which combinations that include the optical signals included in the first and second signal light beams having an overlapping wavelength are omitted, and control the first switch and the second switch in accordance with the obtained combination;

a multiplexing unit configured to multiplex one or more first signal light beams transmitted from the one or more first switches and one or more second signal light beams transmitted from the one or more second switches; and a monitoring unit configured to monitor an intensity of an optical signal multiplexed by the multiplexing unit.

5. A monitoring method of an optical signal, comprising:

receiving a plurality of light beams and wavelength allocation information of optical signals included in each of the light beams;

demultiplexing the light beams received;

switching a plurality of switches between transmitting or blocking with respect to the plurality of light beams demultiplexed;

multiplexing light beams transmitted from the plurality of switches;

monitoring an intensity of the multiplexed light beams;

obtaining, based on the wavelength allocation information, a combination of the light beams not including the optical signals having overlapping wavelengths; and controlling the plurality of switches in accordance with the combination.

* * * * *